United States Patent
Yu et al.

[11] Patent Number: 5,303,661
[45] Date of Patent: Apr. 19, 1994

[54] DRY PROCESS FOR SPEEDY AND CONTINUOUS RECYCLING DISCARDED RUBBER

[76] Inventors: Chun-An Yu, No. 114, Yuan Ta Rd., Sec. 2, Ta Pu Li, Yuan Lin Town, Changhua Hsien; Chai-I Shiao, No. 7, Alley 64, Lane 247, Yuan Chi Rd., She Tow Ts;un, She Tow Hsiang, Changhun Hsien, both of Taiwan

[21] Appl. No.: 71,401

[22] Filed: Jun. 4, 1993

[51] Int. Cl.5 .................................. F23B 7/00
[52] U.S. Cl. ........................................ 110/341
[58] Field of Search ............... 110/218, 224, 232, 341, 110/347

[56] References Cited

U.S. PATENT DOCUMENTS 4,387,652 6/1983 Cooke et al. .................. 110/224
5,069,145 12/1991 Croke ......................... 110/232 X
5,226,375 7/1993 Fukuda ....................... 110/347 X Primary Examiner—William E. Tapolcai
Attorney, Agent, or Firm—Browdy and Neimark

[57] ABSTRACT

A dry process for speedy and continuous treatment of discarded or used rubber waste is disclosed wherein discarded rubber waste is pulverized into particles of 20-40 mesh and is transmitted to an air tight vessel in which the pulverized rubber waste is indirectly preheated at a temperature between 100°-200° C.; and is then delivered to a fast reactor in which many additives, such as process oil, minerals, rosin and zeolite, are blended with the pulverized rubber waste. The mixture is further stirred by way of a motor to permit the process oil to effectively penetrate into the pulverized rubber waste; and is finally refined to get useful recycled rubber material.

1 Claim, 2 Drawing Sheets

DRY PROCESS FOR SPEEDY AND CONTINUOUS RECYCLING DISCARDED RUBBER

BACKGROUND OF THE INVENTION

The present invention relates to a dry process for continuous and speedy treatment of discarded rubber waste with an intention to recycle the rubber waste without water and air pollution as in a conventional rubber recycling process. Pulverized rubber waste in the dimension of 20-40 mesh are preheated in an air tight vessel at 100°-200° C., and then delivered to a fast reactor by conveyor belt to blend with many kinds of additives, the mixture is further stirred by way of a motor, converting the used rubber waste into recycled rubber powder which is subjected to a refinery process so as to obtain recycled rubber material at the end of the process. There will be no air and water pollution produced in the process and no foul smell of pine tar will be generated either. The process can mass treat rubber waste in such a manner that it can effectively economize the time and labor used in the production thereof.

The present invention intends to provide a pollutionless and low-cost process to turn used or discarded rubber waste into reusable rubber material so as to effectively alleviate the current enviromental pollution problem.

Generally, at present, used or discarded rubber waste is recycled by way of a steam method wherein, as shown in FIG. 1, pulverized rubber waste A of the dimension of 20-40 mesh is first mixed with desulfurizing agent, pine tar and calcium carbonate at a temperature of 40°-80° C. and under a pressure of 6-13 kg/cm$^2$ in process B; and the mixture is in the following proportion: desulfurizing agent 0.1%-1%, pine tar 15%-20%, and calcium carbonate 15%-20%. The so blended mixture is then delivered into a steaming vessel and undergoes steaming operation in process C for about 6 to 13 hours so as to obtain recycled rubber powder which is then subject to a cooling process D. After 6 to 10 hours of cooling, a refining process E is carried out to get recycled rubber material F.

Such prior art process must take a steaming step for about 6-13 hours in one aspect and the discharged water produced in the steaming process is the main source of pollution; and the various gases produced therein will get the air polluted at the same time. Such pollution has been seriously rejected by people living around a factory in any developed country. Moreover, the time consumed and labor used in this prior art are another two disadvantages.

SUMMARY OF THE PRESENT INVENTION

Therefore, the primary object of the present invention is to provide a dry process for speedy and continuous treatment of used or discarded rubber waste in a pollution free manner and without generation of foul smell of pine tar.

Another object of the present invention is to provide a dry process for speedy and continuous treatment of discarded or used rubber waste wherein no polluted water will be generated in the process.

One further object of the present invention is to provide a dry process for speedy and continuous treatment of discarded or used rubber waste, which is time and labor saving and simple in operation.

DETAILED DESCRIPTION OF THE PREFERRED EMBODIMENT

Figure 1:
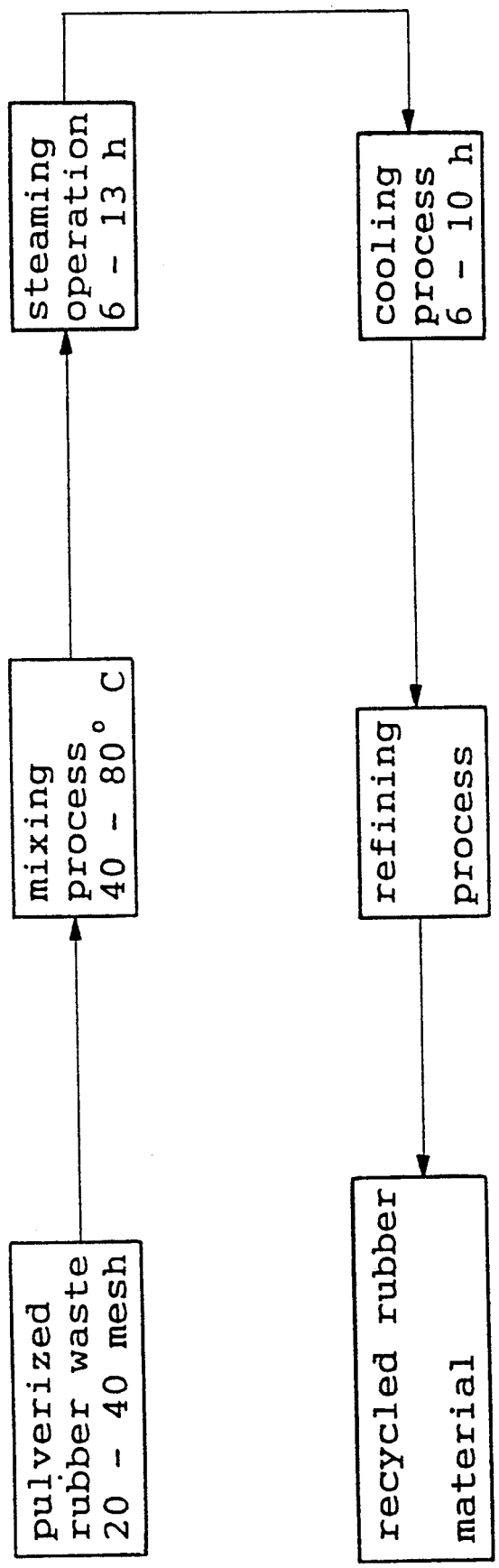
FIG. 1 is a flow chart of a conventional process.
Figure 2:
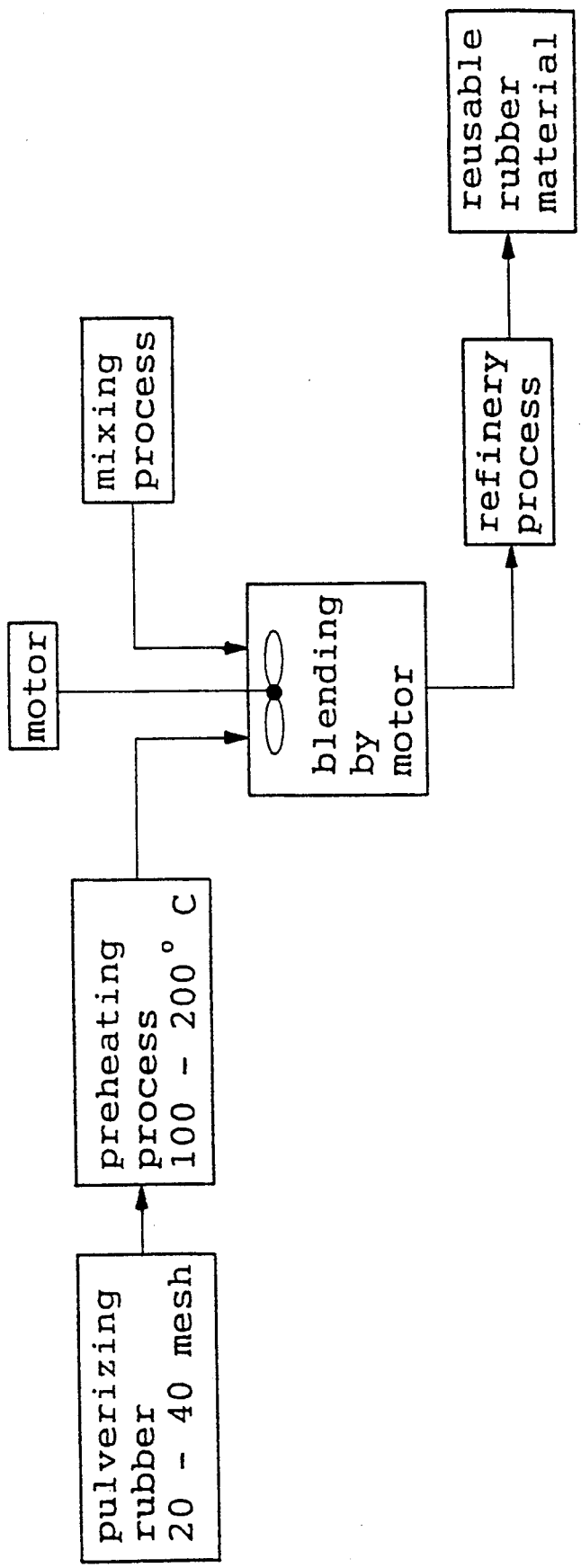
FIG. 2 is a flow chart of the present invention.

Referring to FIG. 2, in the present process, discarded or used rubber waste pulverized into particles A of the dimension of 20-40 mesh is first preheated at a temperature between 100°-200° C. in an airtight vessel in a preheating process G, and then is transmitted by conveyor belt into a fast reactor in mixture with many additives H in a blending process I wherein a motor M is used to affect the blending.

The additives include process oil which is used to get the pulverized rubber waste softened and is in the amount of 5%-30% by weight, and is made up of aromatic oil, naphthame oil and paraffine oil; and minerals 5%-20% by weight serving as a filling, such as white clay and articles of the like; and Rosin 5%-20% by weight which can increase the stickiness of the mixture; and zeolite 1%-10% by weight which is used as a catalyst, causing the process oil to readily penetrate into the pulverized rubber waste; and the pulverized rubber waste is further converted into rubber power and finally to reusable rubber material K via a refinerey process J.

It can be clearly seen that the rubber recycling process of the present invention will not create the air and water pollution problem and no foul smell of pine tar will be generated, and the process of regeneration of rubber material is simplified and it can mass recycle discarded rubber waste in a time and labor saving manner.

I claim:

1. A dry process for speedy and continuous recycling discarded or used rubber waste, comprising the steps of:
   indirectly preheating at the temperature between 100°-200° C. pulverized rubber waste in the dimension of 20-40 mesh in a dry and air tight vessel;
   transmitting said preheated pulverized rubber waste by conveyor means into a fast reactor;
   blending the same with additives in said reactor, such as process oil 5%-30% by weight which includes aromatic oil, anphthame oil and paraffine oil; and minerals 5%-20% by weight; and rosin 5%-20% by weight; and zeolite 1%-10% by weight; and the rest being discarded rubber;
   stirring said mixture by way of a motor of said process oil which can get said rubber waste softened; and said minerals which are used as fillings; and rosin which increases stickness of said mixture; and said zeolite which permits said process oil to readily penetrate into said pulverized rubber waste so as to convert said discarded rubber waste into reusable rubber powder;
   refining said recycled rubber powder into usable rubber material.

* * * * *